Nov. 15, 1966  E. J. ALLPORT  3,285,084
DRIVE AND STEERING MECHANISM FOR WHEELED
VEHICLES OR IMPLEMENTS
Original Filed April 12, 1961  4 Sheets-Sheet 1

*INVENTOR.*
EDWARD JAMES ALLPORT
BY
Wolfe, Hubbard, Voit & Osann
*ATTORNEYS.*

Nov. 15, 1966   E. J. ALLPORT   3,285,084
DRIVE AND STEERING MECHANISM FOR WHEELED
VEHICLES OR IMPLEMENTS
Original Filed April 12, 1961   4 Sheets-Sheet 2

INVENTOR.
EDWARD JAMES ALLPORT
BY
Wolfe, Hubbard, Voit & Osann
ATTORNEYS.

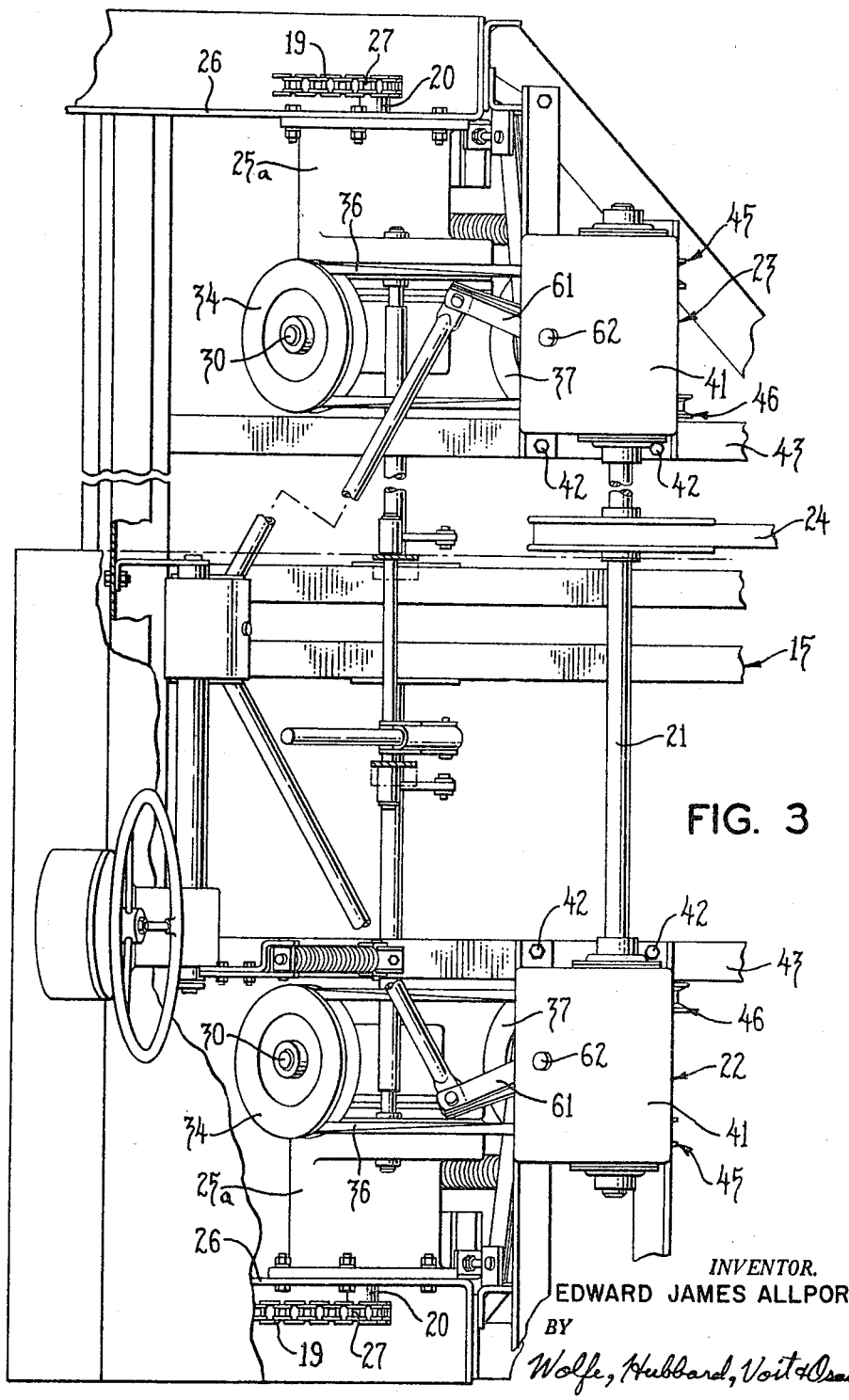

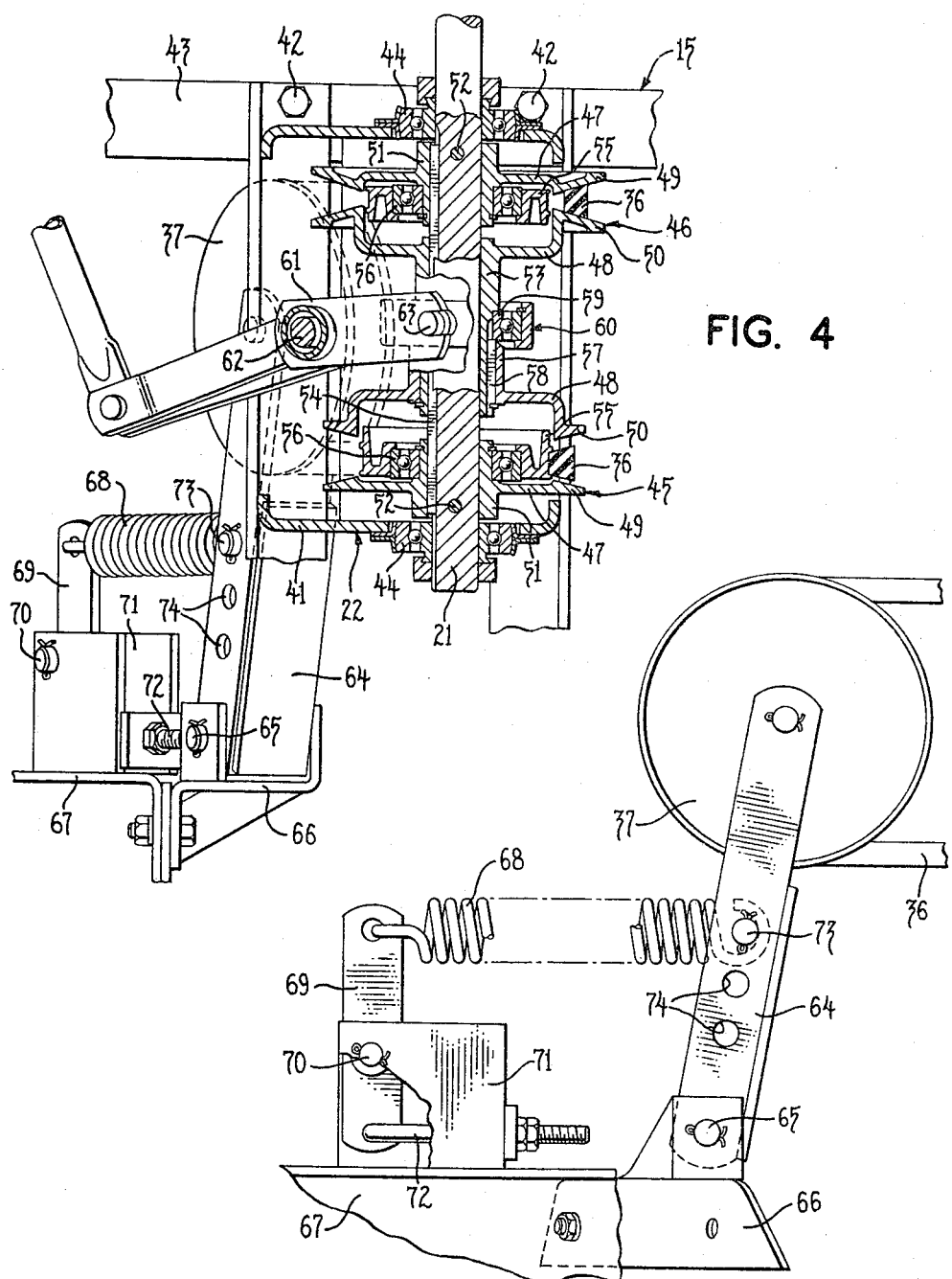

United States Patent Office 3,285,084
Patented Nov. 15, 1966

3,285,084
DRIVE AND STEERING MECHANISM FOR
WHEELED VEHICLES OR IMPLEMENTS
Edward James Allport, Penetanguishene, Ontario, Canada, assignor to Massey-Ferguson Limited, Toronto, Ontario, Canada, a corporation of Canada
Original application Apr. 12, 1961, Ser. No. 102,517, now Patent No. 3,190,385, dated June 22, 1965. Divided and this application May 22, 1964, Ser. No. 369,363
1 Claim. (Cl. 74—218)

The invention relates to self-propelled agricultural implements and more particularly to an improved belt drive transmission and steering mechanism for such implements, and is a division of my copending application Serial No. 102,517, filed April 12, 1961, now Patent No. 3,190,385 for Drive and Steering Mechanism for Wheeled Vehicles or Implements.

One object of the present invention is to simplify the construction of transmissions of the above general character to decrease their cost and to provide greater reliability and easier maintenance.

Another object is to provide a single belt drive transmission embodying improved means of speed and directional control, making it easier and more convenient to operate the implement.

A further object is to provide a single belt drive transmission for wheeled implements which affords a full uninterrupted smooth range of speeds for forward and reverse drive.

A more specific object is to provide an improved reversible variable speed transmission unit particularly suitable for driving wheeled agricultural implements.

Other objects and advantages of the invention will become apparent from the following detailed description of the preferred embodiment illustrated in the accompanying drawings in which:

FIG. 3 is a fragmentary plan view of the implement with parts broken away to show details of the drive and control mechanisms;

FIG. 4 is a fragmentary sectional view through one of the transmission units taken in a plane substantially on the line 4—4 of FIG. 2;

FIG. 5 is a side elevational view of the idler pulley and mounting shown in FIG. 4.

Figure 1:
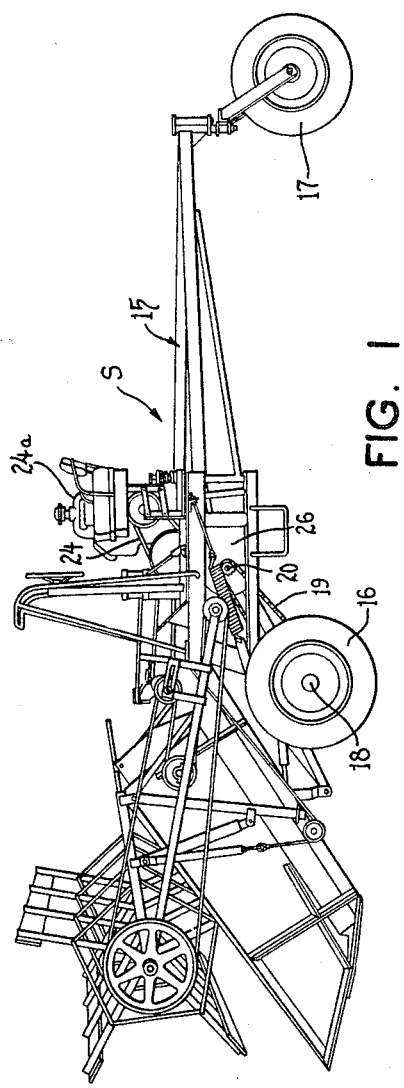
FIGURE 1 is a side view of an implement equipped with a belt drive transmission and controls embodying the features of the invention.

While a preferred embodiment of the invention has been shown and will be described in detail herein, this is not intended to limit the invention to the particular form disclosed, the intention being to cover all modifications and adaptations falling within the spirit and scope of the invention as more broadly or generally characterized in the appended claim.

For purposes of illustration, the invention has been shown as incorporated in an agricultural implement S of the type commonly known as a "swather," although it will be understood that it may be employed to advantage in other types of wheeled implements or vehicles in which lightness of weight and maneuverability are desired. The exemplary implement has a relatively wide frame structure 15 which at its front end carries suitable crop handling means. The frame structure is supported at opposite sides by left and right front wheels 16 and at the rear by a castering gear wheel 17 mounted on a rearwardly projecting portion of the frame.

The front wheels 16 are mounted on separate axles 18 suitably journaled on the implement frame and each axle is driven by a sprocket chain 19 from an individual intermediate drive shaft 20 constituting a part of the novel drive and steering means. The intermediate shafts 20 in turn are individually driven from an engine driven main drive shaft 21 through transmission units 22 and 23 embodying novel features of construction by which the speed and direction of rotation of the intermediate shafts may be easily and precisely controlled.

My before mentioned copending application discloses how transmissions of the type disclosed may be advantageously employed in conjunction with easily operated control means to steer the vehicle. For this reason the emphasis will here be placed on the novel features of transmission, per se.

As shown in FIG. 3, the main shaft 21 extends transversely across the implement frame 15 and it is rotatably supported thereon, as will appear presently. It is driven in this instance by a V-belt 24 from an engine 25 carried on the implement frame as shown in FIGURE 1.

The intermediate drive shafts 20 and their mountings are alike. Thus, each shaft is journaled in a housing 25a (FIGS. 2 and 3) bolted, in this instance, to an upright member 26 of the implement frame. The housings are positioned so as to locate the shafts 20 parallel to and spaced rearwardly of the respective axles 18. The outer ends of the intermediate shafts project from their housings and carry sprocket wheels 27 over which the drive chains 19 are trained, the chains also being trained over sprocket wheels on the respective axles.

Figure 6:
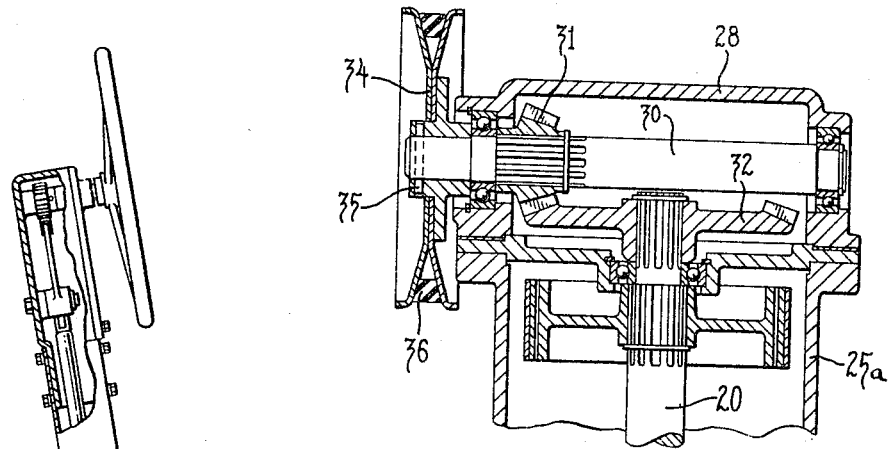
FIG. 6 is a fragmentary sectional view taken in a plane substantially on the line 6—6 of FIG. 2.

As shown in FIG. 6 of the drawings, the inner end of each shaft 20 extends from the housing 25a into a gear casing 28 which rotatably supports a shaft 30 with its axis transverse to that of the shaft 20. A beveled pinion 31 splined to the shaft 30 meshes with a beveled gear 32 splined to the shaft 20 to provide a driving connection to the latter shaft. One end of the shaft 30, in this instance its upper end, projects from the casing 28 and carries a sheave or V-pulley 34 which is nonrotatably fixed to the shaft as by a pin 35. The pulley 34 constitutes the drive pulley through which the intermediate shaft is driven from its associated transmission unit.

In accordance with the invention, the transmission units 22, 23 are constructed in a novel manner so as to provide an ouput speed which is variable from a maximum to a neutral or zero output in either or both a forward and reverse direction. It is a distinctive feature of the invention that the above is accomplished by a drive employing a single belt path, and that speed changes are accomplished with an ease of control, and smoothness unattainable in more conventional structures.

More specifically, in accordance with this aspect of the invention, each of the individual transmission units are constructed and arranged with respect to a control means so that the drive for both shafts can be disengaged or the units can be conditioned to drive their respective intermediate shafts in either direction through single V-belts 36 trained over the pulleys 34 and about idler pulleys 37. The two pulleys are disposed to engage opposite bights of the belt and thus direct the intermediate reaches through the associated transmission unit as will appear presently.

The transmission units 22 and 23 are structurally similar and a description of one will therefore suffice. Referring to the sectional view of the exemplary transmission unit 22 as shown in FIG. 4, the unit includes a housing 41 supported on the implement frame structure 15 and secured as by bolts 42 to a longitudinal member 43 of the frame. The housings 41 of the units 22 and 23 are aligned transversely of the frame and fitted with antifriction bearings 44 journaling the main drive shaft 21. As shown in FIG. 4, each housing carries two of the bearings engaging the shaft at points spaced apart axially of the shaft.

Mounted on the shaft 21, which represents in this case the transmission input shaft, are a pair of drive sheaves or pulleys. Because of their position in the illustrative drive arrangement the pulleys may be appropriately designated by the direction they impart to the shaft 21. Thus, a forward drive pulley 46 and a reverse drive pulley 45 are provided, and adapted to cooperate with opposite reaches of the driving belt 36, as shown in FIG. 4. The pulleys are generally similar to the conventional variable pitch cone type pulley.

In their preferred form, each pulley comprises a pair of members 47 and 48 mounted on and rotatable with the drive shaft 21. The members are formed with oppositely inclined peripheral flanges 49 and 50 which cooperate to form a groove for the belt 36, the effective width of which is adjustable to either grip or release the belt 36. For this purpose, one of the pulley members, in this case, the member 47, has an integral hub 51 restrained against axial movement relative to the shaft as by a pin 52. The other pulley member 48 is mounted on or formed integrally with a sleeve 53 slidable axially of the shaft 21 toward or from the companion member 47. Both members of both pulleys 45 and 46 may be constrained to rotate with the shaft 21 by a key 54 which permits the sleeve carrying pulley members 48 to move axially of the shaft.

The pulleys 45 and 46, as indicated above, are constructed and arranged so that they may be adjusted to completely release the belt 36 from driving engagement with the pulley flanges. This, of course, interrupts the drive from the transmission input shaft 21 and thus constitutes the neutral position of the drive mechanism. To support the belt when so released, each pulley has associated with it an idler or belt supporting pulley 55 disposed in alignment with the belt groove. In the preferred form shown, the supporting pulley is rotatably mounted by an antifriction bearing 56 on the hub 51 of the pulley member 47. To afford clearance for the pulley 55, pulley member 48 is formed with a generally cup-shaped configuration as shown in FIG. 4.

It is an advantage of the transmission that a single V-belt, drivingly engaged in the manner of the invention, is sufficient to accomplish the objective thereof. Accordingly, in assembling the drive, opposite reaches of the single belt 36 between the driven pulley 34 and the idler pulley 37 are trained respectively over the driving pulleys 45 and 46. Since the driving pulleys are fixed to the same shaft, they necessarily rotate in the same direction. Having thus drivingly engaged the pulleys, it will be observed therefore that the output pulley 34, for example, and the shaft 20 (FIG. 2) which it drives can be rotated in either direction by adjusting one or the other (but not both simultaneously) of the transmission pulleys for driving the belt. When the pulley 46 is adjusted for driving the belt, e.g., the intermediate shaft is rotated in a direction to drive the implement forwardly. Under such conditions, the pulley 45 is simultaneously, by virtue of the sleeve 53, adjusted to the nondriving position and the reach of the belt 36 which is trained over it runs idly on the pulley 55 associated with that drive pulley. Conversely, when the pulley 45 is adjusted to belt driving condition, intermediate shaft 20 is rotated in a direction to drive the vehicle reversely—that is, backward. Under those conditions, the pulley 55 associated with the drive pulley 46 supports the idly running reach of the belt trained over the latter pulley.

To insure that proper sequence of operations of the pulleys 45 and 46 for starting, stopping, and reversing the transmission output, the shiftable members 48 are constrained to move as a unit by the sleeve 53. In the particular embodiment illustrated, the pulley member 48 of the inner or reverse drive pulley is formed integrally with the sleeve. The corresponding member of the outer or forward drive pulley is formed with a hollow hub 57 dimensioned to telescope over the end portion of the sleeve which is reduced in diameter as shown in FIG. 4. A key 58 constrains the sleeve and pulley member to rotate together.

The separable construction of the pulley member and sleeve as above described provides a peripheral groove in the sleeve for the reception of an inner race ring 59 of the antifriction bearing 60 constituting a shifter ring by which the pulley members may be shifted to determine the operation of the transmission unit.

An exemplary transmission control is fully discussed in the previously noted copending application and hence its specifics will be treated only lightly here.

Figure 2:
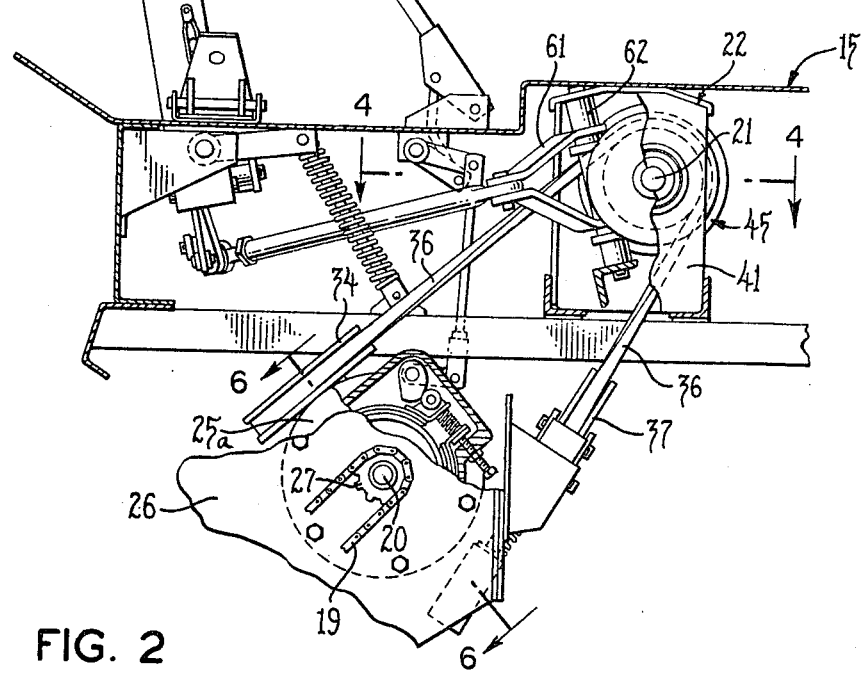
FIG. 2 is a fragmentary sectional view taken in a vertical plane substantially on the central axis of the implement.

The mechanism shown for controlling the shifting sleeve includes a bell crank lever 61 pivotally mounted on a pin 62 to swing about an axis disposed transversely to and spaced laterally from the shaft 21 on which the pulley and sleeve assembly slides. As shown in FIG. 2, the pivot 62 is supported within the housing 41 of the transmission unit by suitable supporting members incorporated in the housing. One end of the lever 61 is forked and extended to straddle the shifter ring 60. Pins 63 (FIG. 4) projecting from the outer race of the shifter ring bearing engage in apertures in the forked ends of the lever to provide an operative connection whereby the ring and pulley and sleeve assembly may be shifted axially along the drive shaft 21 to selectively engage and disengage the drive pulleys 45 and 46.

It will be appreciated that a slight shifting of the sleeve 53 results in a change of the effective diameter of the pulley drivingly engaging the belt at the time of such shift. Referring to FIG. 4, if for example, the pulley 46 is in driving engagement with the belt, the speed imparted to the pulley 34 will be in proportion to the respective effective diameters of each, the effective diameter of the pulley being defined, for the purpose of describing the invention, as the distance from the center of rotation of the belt to a point approximately laterally disecting the belt engaged thereby. Quite naturally, if the peripheral flanges 49, 50 of the pulley are laterally spread, or brought closer, the belt, by virtue of its inherent width, will move inwardly or outwardly, thus altering the effective diameter of the pulley. Such a change also affects the proportion between the effective diameters of the drive pulley and pulley 34, thereby permitting a speed change to be effected.

However, an adjustment of the pulleys 45 or 46 between the engaged and disengaged positions results in a change in the over-all length of the belt path around the pulleys 34 and 35. Thus, in order to make full use of the change-speed capabilities of the transmission, it is a feature of the invention that a belt tension suitable to effect constant driving relation without excessive belt wear is provided. To compensate for belt slackening or tightening due to pulley diameter changes, the idler pulley 37 associated with each transmission is yieldingly supported to give or take up slack where needed. To this end, an exemplary support is provided in this instance by an arm 64 pivotally mounted as by a pin 65 on a bracket 66, bolted or otherwise secured to an element 67 of the implement frame structure adjacent the housing for the intermediate shaft 20 driven by the transmission. A coil spring 68, of suitable strength, is connected between the arm 64 and an anchoring member 69 on the frame, and urges the arm and pulley 37 in a direction to apply tension to the belt 36. The anchoring member 69 preferably comprises a lever pivoted intermediate its ends by a pin 70 to a bracket 71 carried by the frame member 67. Spring 68 is hooked to one end of the lever and an adjustable draw bolt 72 connected between the other end of the lever and the bracket 71 holds the lever stationary and provides means for rocking it to adjust the tension applied by the spring to the idler pulley supporting arm. The spring tension exerted on the arm 64 may be further adjusted by changing the point at which the spring 68 is connected to the arm, such connection being effected by a pin 73 engageable in a selected one of three sets of holes 74 provided in the sides of the arm and progressively spaced from the pivotal axis of the arm.

By maintaining the belt under a condition of controlled tension at all times during the operation of the transmission, the transmission output is rendered highly responsive to small changes in the effective diameter of the driving pulley. Thus, a suitable control connected with the sleeve 53 will permit smooth and uninterrupted variations in output speed by merely shifting the sleeve, in the case of pulley 46, to the left as seen in FIG. 4 to increase output speed, and to the right to decrease output speed.

It will also be observed that by suitable movement of the sleeve, as described hereinbefore, the pulley 46 is rendered ineffective, i.e., zero effective diameter, and pulley 45 engages the belt for driving the same in a reverse direction. The pulley 45 is subject to the same degree of control by the shifting sleeve, and therefore the same smooth performance may be expected.

Finally, it will be well to observe that although in illustrating the invention the shaft 21 was designated the power input shaft, and pulley 34 as driven by the transmission output, pulley 34 could be used to supply power to the transmission, and the output controlled with equal facility to the shaft 21.

What I claim is:

A reversible, variable speed transmission comprising, in combination, a power shaft, a pair of controllable pulleys spaced axially on said power shaft, each of said controllable pulleys having a first conically flanged member fixed to said shaft, each of said controllable pulleys also having a second conically flanged member keyed to, but axially slidable on said power shaft between said first flanged members, means for shifting said second flanged members axially on said shaft in unison so that the conical flanges on said first and second member of each controllable pulley move toward and away from one another and define variable diameter pulleys, each of said controllable pulleys having a substantially cylindrical support pulley freely journalled on said power shaft and positioned between the respective first and second members of the controllable pulleys, a power pulley, an idler pulley, a V-belt extended about and between said power pulley and said idler pulley with the intermediate belt runs being trained respectively about said controllable pulleys, and means for movably supporting and biasing said idler pulley for maintaining said V-belt in tension while compensating for changes in the diameter in either of said controllable pulleys.

References Cited by the Examiner

UNITED STATES PATENTS

| | | | |
|---|---|---|---|
| 815,433 | 3/1906 | Johnson | 74—220 |
| 2,084,808 | 6/1937 | Hyde | 74—220 X |
| 2,589,032 | 3/1952 | Amonsen | 74—220 |
| 2,634,620 | 4/1953 | Firth | 74—230.24 X |
| 2,729,834 | 1/1956 | Emerick | 74—220 X |
| 2,824,457 | 2/1958 | Norton | 74—230.17 |
| 2,869,317 | 1/1959 | Schurr et al. | 74—220 X |

FOREIGN PATENTS 580,060   8/1946   Great Britain.

DAVID J. WILLIAMOWSKY, *Primary Examiner.*

J. A. WONG, *Assistant Examiner.*